May 6, 1958

P. S. MORGAN

2,833,160

TRANSMISSIONS

Filed Sept. 4, 1952

INVENTOR
Porter S. Morgan

BY Johnson and Kline
ATTORNEYS

May 6, 1958 P. S. MORGAN 2,833,160
TRANSMISSIONS
Filed Sept. 4, 1952 3 Sheets-Sheet 2

INVENTOR
*Porter S. Morgan*

BY *Johnson and Kline*
ATTORNEYS

United States Patent Office 2,833,160
Patented May 6, 1958

2,833,160

TRANSMISSIONS

Porter S. Morgan, Westport, Conn., assignor to Morgan Development Laboratories, Inc., Westport, Conn., a corporation of Delaware Application September 4, 1952, Serial No. 307,757

22 Claims. (Cl. 74—681)

This invention relates to power transmissions, and more particularly to those involving gear sets or trains for producing various ratios of speed between a drive shaft and a driven shaft.

An object of the present invention is to provide an improved mechanical power transmission of general utility in which the ratio of speed reduction or increase is universally variable over the entire range which the device is constructed to embrace.

Universally variable speed change units are known and are in general use but, except in a comparatively small part of their useful range, they are extremely inefficient and wasteful of power. On the other hand, transmissions having selective gear sets controlling a plurality of fixed speed ratios are highly efficient but have the drawback that they cannot be shifted or selected without interrupting the transmission of power, as by the use of a clutch, and are limited in their application to the predetermined fixed ratios selected.

The present invention combines the functions of the variable speed unit and the fixed ratio unit in a unique and extremely advantageous manner whereby the transmission of power or motion alone, where power is an insignificant factor as in instruments, is controllable conjointly by a selective gear transmission and a variable speed transmission, the latter operating within a limited range, preferably that of its greatest efficiency, and which range covers the difference between the ratios of successive selectable gear sets.

Thus, according to the present invention in one of its embodiments, the variable speed unit may have a ratio from infinity or zero motion to a ratio of say 4:1, at which time, by operation of selective gearing, the ratio of 4:1 may be maintained independently of the variable speed unit, the latter returning to its zero speed position. Subsequent operation of the variable speed unit adds its increment of motion and power to that of the fixed ratio gearing and controls the range of speeds between the first gear set and the next. When the ratio has been changed by the variable speed unit to make it isochronous with the next gear set, the latter is brought into play while the first gear set is rendered inoperative. The continued advancement through the ranges of ratio down to any desired ratio may follow the same pattern. The arrangement is such that the gear sets which are made effective are traveling at synchronous speeds, that is to say, they are isochronal, and therefore may be clutched or otherwise connected without clashing and, further, the arrangement is such that at the time of the connection of the gears they are not necessarily under load.

Thus it will be seen that the present invention provides a transmission with fixed ratio ranges with supplemental means for changing the ratio between the fixed ranges and a method and means whereby the speed may be changed gradually to and between the fixed ratios.

In several forms of the invention herein disclosed, the main fixed ratio unit and the variable speed unit are connected in parallel between the drive shaft and the driven shaft by means of a differential movement so organized and arranged with the fixed ratio unit that the selectable gear sets which are to be made operative are brought into synchronism by the operation of the device.

As will be pointed out below, to facilitate the selection of the gears and permit them to become synchronized at the fixed ratios controlled by the transmission, the power and motion is temporarily carried by supplemental gear sets, the sequence of operation descending in ratio being: (1) the adjustment of the variable speed unit; (2) the shifting of the load to a supplemental gear set; (3) the readjustment of the variable speed unit to the limit of its movement; (4) the shifting of the load to the fixed main selectable gear set and the disconnection of the temporary gear sets; (5) then the assumption of part of the load by the variable speed unit during the movement thereof to change the speed between the fixed ratios until the next fixed ratio is reached; (6) the shifting of the entire load again to the supplemental gear sets during the readjustment of the variable speed unit to the other limit of its movement; (7) the connection of the main gear set and the disconnection of the supplemental gear set; and so on through the successive fixed and variable ratios to the limit for which the mechanism is designed. Ascending in ratio the reverse procedure is followed.

In another embodiment of this invention, instead of the variable speed unit operating between zero speed and some determinate speed output, it may be arranged to operate between one determinate speed and another determinate speed, the direction of operation of the gearing of the differential being arranged to give algebraic totals or resultants of the fixed speeds and the variable speeds so that, under proper settings of the variable speed unit, zero speed of the driven shaft is attained even tho the output shaft of the variable speed unit has a determinate speed.

Thus, if it is found that a variable speed unit operates at its highest efficiency when its output shaft is operating at say between 1500 and 2000 R. P. M., the gearing of the present invention, including differential mechanism, may be so arranged that, say at 1500 R. P. M. on the variable speed output shaft, zero speed is produced on the driven shaft of the transmission.

In another form of the invention, the variable speed unit and the main and supplemental gear sets are so arranged that it is not necessary to employ a differential mechanism in the system. In this form of the invention, the variable speed unit is designed to operate from zero to a determinate speed, say 2000 R. P. M., in decreasing the ratio from infinity, say 4:1, the ratio of the first fixed ratio gear set, and from then on the variable speed unit operates between the said high determinate speed and some intermediate determinate speed, say 1000 R. P. M., and the supplemental and main fixed ratio gear sets are arranged to be brought into isochronal mesh when the variable speed unit is at said determinate speeds.

Figure 1:
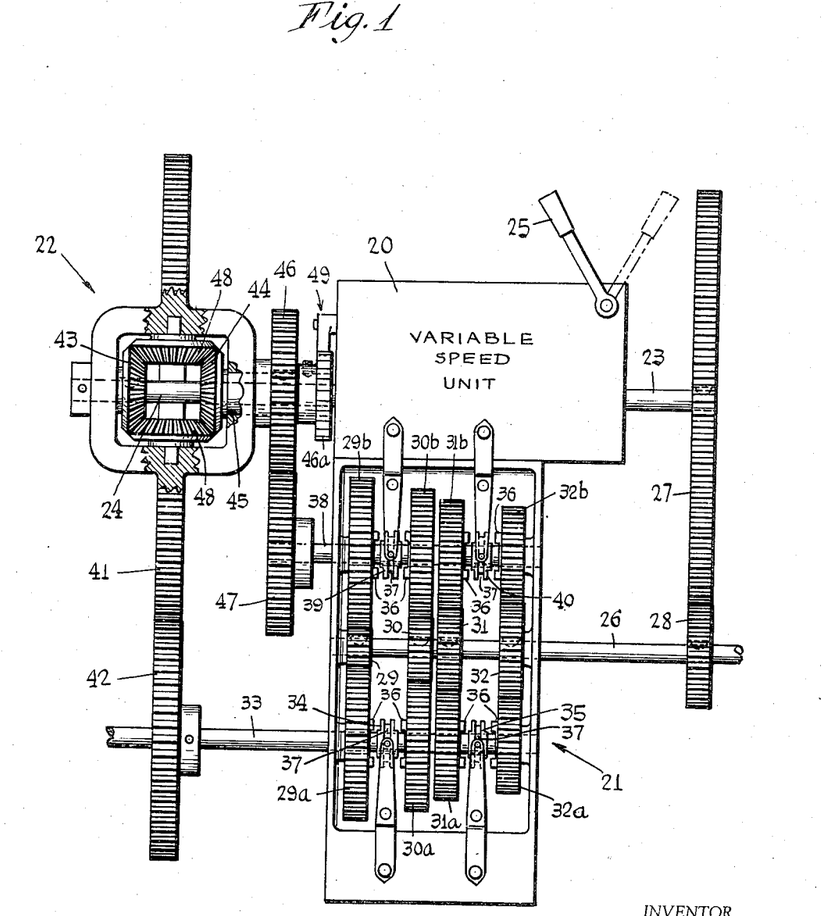
Figure 1 is a schematic view showing one form of this invention in which a differential mechanism is employed.

While mechanism is provided by the present invention and illustrated herein for the cyclical control of the gear sets and the variable speed unit, it should be understood that the methods of changing the ratio between the driving and driven shafts may be carried out entirely or partially by hand; and for this purpose, as illustrated in the form of the invention shown in Fig. 1, manually operable handles may be provided for individually connecting the supplemental and main gear sets and for operating the variable speed unit.

In instances where the load is or may be relieved from the driven shaft to the transmission, or where the load is so slight as to be negligible, or where the power applied to the driven shaft of the transmission is sufficient to overcome the load in the ratio desired, the fixed and supplemental gears need not be operated in sequence between highest and lowest ratio, but the ratio desired may be preselected and variations plus and minus from such ratio within the range for which the transmission is designed may be produced as desired or needed by the manipulation of the control handles.

In the examples given herein, in order to expedite the understanding of the operation of the transmission, the speed of the driving shaft is given as though its R. P. M. were constant. It should be understood, however, that this is merely for ease of understanding and that the driving shaft may itself have variable speeds. For instance, it may be connected to a prime mover such as an internal combustion engine which may itself accelerate and decelerate, in which situation the speed of the various parts of the transmission will increase and decrease and the transmission of this invention will vary the ratios of the speed of the driving shaft to that of the driven shaft.

Other features and advantages will hereinafter appear.

For purposes of illustration, several embodiments of the invention are shown in the accompanying drawings, and these drawings are diagrammatic to the extent that bearings and other structural elements providing support for the parts as well as means for lubricating the parts are omitted, for these things are well known to persons skilled in the art.

In the form of the invention shown in Fig. 1 to selection and manipulation of the gear sets and the variable speed unit may be performed by hand operations. Such a unit is admirably suited for use with small machine tools, such as lathes, where a universally variable change speed transmission is desirable.

As illustrated in Fig. 1, for clarity the transmission is shown as made up of three units—a variable speed unit 20, a selectable gear set unit 21 and a differential unit 22.

Figures 3, 4:
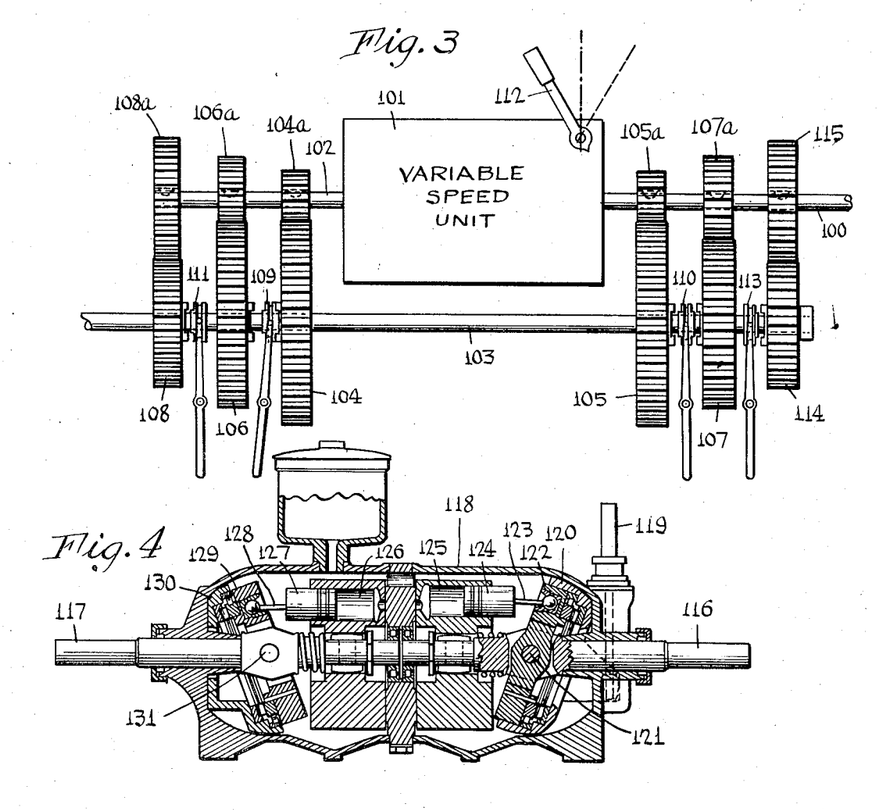
Fig. 3 is a similar view showing the form of the invention in which no differential mechanism is employed, showing means for automatically controlling the operations of the variable speed unit and the clutches.
Fig. 4 is a sectional view of a variable speed unit which may be employed in the embodiments of the present invention herein illustrated.

The variable speed unit may be of any suitable type or construction capable of handling the loads and efficiently operating at the speeds desired. It may be mechanical, electrical, hydraulic, or a combination of these. In Fig. 4, I have illustrated a conventional hydraulic variable speed unit which is suitable and which will be described in detail below. Suffice it to say here that the unit has a power input shaft 23 and a power output shaft 24, and a handle 25 movable between limits shown in full and dotted lines respectively in Fig. 1, for varying the ratio between the input shaft 23 and the output shaft 24. In the particular form of the invention illustrated in Fig. 1, when the handle 25 is in the position shown in full lines in Fig. 1, the output shaft 24 is stationary, i. e. has zero speed. When the handle 25 is in the position shown in dotted lines in Fig. 1, the output shaft has a determinate speed arbitrarily selected as 500 R. P. M. for purpose of easy explanation.

The input shaft 23 of the variable speed unit 20 is connected to the driving shaft 26 by a gear 27 meshing with a gear 28 on the shaft 26 which is connected to the usable power such as a prime mover not shown. In the example given, it is assumed that the driving shaft 26 has a speed of 2000 R. P. M. The gears 27 and 28 have a 4:1 ratio.

The driving shaft 26 extends into the selectable gear unit 21 and has secured to it gears 29, 30, 31 and 32 of increasing diameters determining the fixed ratios of speed to be provided by the unit. Extending through and beyond the unit 21 is a driven shaft 33 which constitutes the power takeoff of the transmission. Within the unit and concentric with the shaft 33 are gears 29a, 30a, 31a and 32a meshing with the gears 29, 30, 31 and 32 and of decreasing diameters. Using the example of 2000 R. P. M. as the rotation of the shaft 26 and gears 29 to 32, it will be seen that the gear 29a rotates at 500 R. P. M., the gear 30a rotates at 1000 R. P. M., the gear 31a rotates at 1500 R. P. M., and the gear 32a rotates at 2000 R. P. M.—these constituting the fixed ratios of 4:1, 2:1, 1½:1 and 1:1.

For purposes of illustration, the gears 29a to 32a are shown as bearing directly upon the driven shaft 33, but it should be understood that each of these gears may be supported independently of the shaft.

Between the gears 29a and 30a there is a clutch or coupling 34 (double-face crown clutch as shown) splined to the shaft 33. Likewise, between the gears 31a and 32a there is a similar clutch or coupling 35 splined to the shaft 33. The gears 29a and 30a, and 31a and 32a have clutch teeth 36 facing the clutches 34 and 35 between them respectively, and the clutches 34 and 35 have annular grooves 37 by means of which the clutches may be moved axially to engage respectively the gears on opposite sides of them.

It will be understood that without more, if the clutch 34 is shifted to engage the gear 29a, a fixed and determinate ratio of 4:1 is established between the driving shaft 26 and the driven shaft 33, and in the form shown, by the adjustment of the clutches, four different ratios may be attained between the driving shaft 26 and the driven shaft 33. However, as will appear below, the gear sets, including the gears 29, 29a, 30, 30a, 31, 31a and 32, 32a, are and will herein be designated as supplemental gear sets, since their functioning is transitional in the operation of the device.

The fixed ratio gear unit 21 also has extending through it and beyond a shaft 38 and concentric with the shaft are gears 29b, 30b, 31b and 32b corresponding in size and position to the gears 29a to 32a and meshing respectively with the gears 29 to 32. Between the gears 29b and 30b there is a clutch 39 and between the gears 31b and 32b there is a clutch 40. Like the gears 29a to 32a, the gears 29b to 32b may have their bearings directly on the shaft 38 or they may have independent bearings. Also, like the gears 29a to 32a, the gears 29b to 32b have clutch teeth 36 to engage the teeth on the clutches 39 and 40 respectively, and the clutches have annular grooves 37 by means of which they may be shifted laterally to engage the gears on opposite sides of them.

While the driving shaft 26 is capable of having direct connection by manipulation of the clutches 34 or 35 to the driven shaft 33 and a direct connection to the shaft 38 by manipulation of the clutches 39 and 40, the shaft 38 is connected to the driven shaft 33 only through the differential mechanism 22. Likewise, the output shaft 24 of the variable speed unit is connected to the driven shaft 33 only through the differential mechanism 22.

The differential mechanism 22 in the form of the invention shown herein as exemplary thereof is of the bevel gear type having as its essential driving element a spider gear 41 in constant mesh with a gear 42 secured to the driven shaft 33. The differential also includes a first driving bevel gear 43 secured to the output shaft 24 of the variable speed unit and a second driving bevel gear 44 secured to a sleeve 45 also carrying a gear 46 rotatably mounted on, or at least concentric with, the shaft 24. The gear 46 meshes with a gear 47 secured to the shaft 38 of the selectable gear unit 21. Between the bevel gears 43 and 44 and meshing with them are idler gears 48 rotatably mounted on the spider gear 41. In this way, rotation of the bevel gear 43, or the bevel gear 44, or both, results in rotation of the spider gear 41 and through the latter and the gear 42 which meshes with it the driven shaft 33, and thus motion and power may be transmitted to the driven shaft 33 either through the shaft 38 of the selectable gear unit or the shaft 24 of the variable speed unit, or both, depending upon the selectable gear sets which are operative and the settings of the handle 25 of the variable speed unit.

Assuming that the driving shaft 26 is rotating at 2000 R. P. M. and the handle 25 of the variable speed unit is in zero position and the clutches 34, 35, 39 and 40 are in neutral or disengaged position and that the bevel gear 44 is held against retrograde motion by a suitable lock, ratchet or brake 49 acting on the gear 46a, movement of the handle 25 will cause the shaft 24 to rotate and with it the bevel gear 43. The bevel gear 44 being held against retrograde rotation by the brake 49 thereby causing the idler bevel gears 48 to roll on the gear 44, causes the spider gear 41 to rotate at half the speed of the bevel gear. Since the spider gear is twice the diameter of the gear 42 with which it meshes, the driven shaft 33 will have the same R. P. M. as the bevel gear 43. Continued movement of the handle 25 to the upper limit of its movement will bring the speed of the driven shaft 33 to 500 R P. M. At the same time the gears 29a to 32a are being rotated by the driving shaft 26 and the gear 29a is being rotated at 500 R. P. M., being now in synchronism with the driven shaft 33. When this condition is reached, the clutch 34 is moved into engagement with the gear 29a and a fixed ratio of 4:1, that is, 2000 R P. M. to 500 R. P. M. is established. This being a geared connection with the driving shaft 26 and the driven shaft 33, the entire load being transmitted may be taken by the gears 29 and 29a. When this condition is established, the handle 25 of the variable speed unit may be returned to its zero positoin. As the speed of the bevel gear 43 reduces, the bevel gear 44 begins to move forwardly until, when the gear 43 has no rotation, the gear 44 through the idler gears 48 reaches a speed of 500 R. P. M. due to the rotation of the spider gear at 250 R. P. M. The bevel gear 44, being connected by gears 46 and 47 to the shaft 38 of the fixed ratio unit 21, causes the shaft 38 to move in synchronism (500 R. P. M.) with the gear 29b. At this time the clutch 39 may be operated to connect the gear 29b to the shaft 38 and when this occurs the load is divided between the gears 29a and 29b and the speed at 500 R. P. M.—in other words, a ratio of 4:1 is established through the main drive gears 29 and 29b.

If the speed of the driven shaft is to be increased beyond this point, the clutch 34 is disengaged from the gear 29a and the handle 25 of the variable speed unit is advanced the desired extent. When the handle 25 is moved to the upper limit of its motion, the shaft 24 of the variable speed unit is again brought to 500 R. P. M. while the bevel gear 44 is rotating at 500 R. P. M. due to the engagement of the gear 29b with the gear 29. The result of this through the differential action is that the spider gear is brought to a speed of 500 R. P. M. and the driven shaft 33 is brought to a speed of 1000 R. P. M.

If the speed of the driven shaft 33 is to be increased beyond 1000 R. P. M., the clutch 34 is shifted to engage the gear 30a which through the gear 30 is rotating at 1000 R. P. M., the ratio being 2:1; thus establishing again a direct drive from the driving shaft 26 to the driven shaft 33. Immediately after this, the clutch 39 is shifted to neutral position to free the shaft 38 from the gear 29b, and the handle 25 of the variable speed unit is returned to zero position in which the shaft 24 and bevel gear 43 are stopped. The gear 42 on the driven shaft now rotating at 1000 R. P. M. rotates the spider 41 at 500 R. P. M. with the result that the bevel gear 44 and shaft 38 to which it is connected rotates at 1000 R. P. M., and hence is in synchronism with the gear 30b so that the clutch 39 can be moved to engage the gear 30b and effect the drive through the latter to the differential. The clutch 34 may then be disengaged from the gear 30a permitting the speed of the driven shaft 33 to be increased by the renewed advancement of the variable speed control handle 25.

This sequence of operations may be repeated, first advancing the variable speed lever 25, then operating a clutch on the shaft 33, then operating a clutch on the shaft 38, and then rendering a clutch on the shaft 33 inoperative, until finally the clutch 40 engages the gear 32b, in which case a ratio of 1:1 between the driving shaft 26 and the driven shaft 33 is established, and then operating the variable speed handle 25 for an additional overdrive of 2000 to 2500 R. P. M.

At any point in the cycle of operations at which it is desired to reduce the speed of the driven shaft 33, i. e. increase the ratio between the driving shaft and the driven shaft, the reverse operations may be performed. For example, assuming the clutch 39 engaged with the gear 30b, which produces a speed of 1000 R. P. M. on the driven shaft 33, and the handle 25 midway the limits of its movements, which would add another 250 R. P. M. making a speed of 1250 R. P. M., retraction of the handle to its zero speed position would reduce the speed of the driven shaft to 1000 R. P. M., then the clutch 34 would be engaged with the gear 30a, which is also turning at 1000 R. P. M., making a transitory direct drive between the shafts 26 and 33, then the clutch 39 would be disengaged from the gear 30b freeing the shaft 38 and the bevel gear 44, then the variable speed control handle 25 would be advanced to its upper limit resulting in the bevel gear 43 rotating at 500 R. P. M. in the same direction as the spider gear 41 with the result that the bevel gear 44 will rotate at 500 R. P. M. This causes the shaft 38 to rotate at 500 R. P. M. permitting the clutch 39 to engage the gear 29b. After this is done, the clutch 34 is disengaged from the gear 30a and the drive is divided between 500 R. P. M. supplied from the shaft 38 and 500 R. P. M. supplied from the variable speed shaft 24. The variable speed handle 25 may then be moved from its zero position to reduce the increment of movement supplied by it, and thus reduces the speed of the driven shaft 33 to whatever speed is desired until a speed of 500 R P. M. is reached in which the above operations are repeated.

It will thus be seen that the speed of the driven shaft 33 may be gradually increased from zero to maximum 2500 R. P. M. in the example given without gaps, that is to say, universally, and that it may be decreased in like manner.

Where loads transmitted are inconsequential or are such that suitable clutches may be shifted in spite of existing loads, as, for example, in the operation of instruments as distinguished from work-performing machines, or where the prime mover acting on the driving shaft 26 is capable of picking up the load, it is not necessary in preselecting a speed range to go through the entire cycle of operations. For instance, if the range of speeds in the example given is between 1000 and 1500 R. P. M., it is merely necessary, the above conditions prevailing, to shift the clutch 39 into engagement with the gear 30b and operate the variable speed unit to get variations of speed between 1000 and 1500. If it is desired to go below 1000 R. P. M. or above 1500 R. P. M., the clutches may be shifted as and in the sequence above referred to.

For convenience, the clutches employed in the form of the invention herein illustrated are of the mechanical crown type having no lateral component of force when engaged, but it should be understood that any suitable or desirable clutches or couplings, either electrical or mechanical or hydraulic, may be employed.

Figure 2:
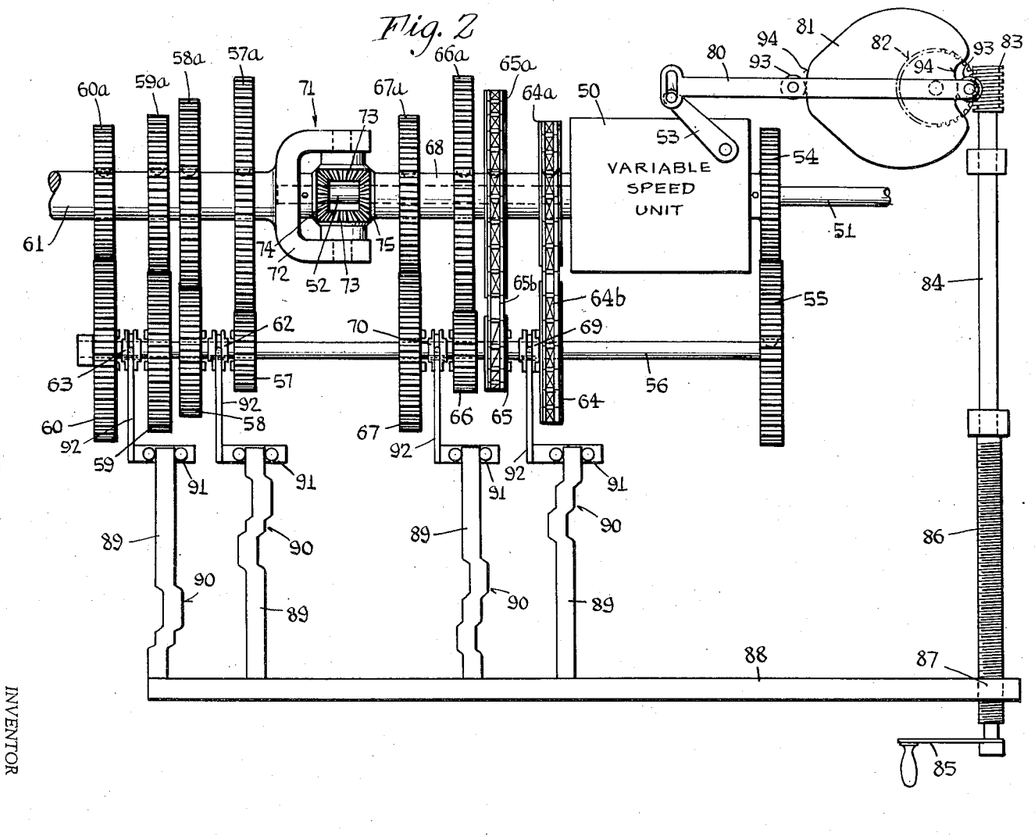
Fig. 2 is a similar view showing another form of this invention, also employing a differential mechanism.

The form of the invention shown in Fig. 2 is exemplary of an arrangement whereby the variable speed unit may have an operating range between one determinate speed and another determinate speed as distinguished from the form shown in Fig. 1, where the range is from zero to a determinate speed.

As shown in Fig. 2, the variable speed unit 50 is connected to the driving shaft 51 and has an output shaft 52, the speed of which may be varied by operation of a control lever 53. Assuming the speed of the driving shaft 51 to be 2000 R. P. M., the output shaft 52 may be varied over the range of from 1500 R. P. M. to 2500 R. P. M.

Secured to the driving shaft 51 is a gear 54 meshing with a gear 55 secured to a shaft 56 which, in this case, is in the nature of a countershaft having concentric therewith and actually carried thereby, in the form shown, gears 57, 58, 59 and 60 of progressively increasing diameters meshing with gears 57a, 58a, 59a and 60a of progressively decreasing diameters and each fixed to the driven shaft 61. Between the gears 57 and 58 and connectible to either of them there is a double face clutch 62 and between the gears 59 and 60 and connectible to either of them there is a double face clutch 63. The clutches 62 and 63 are splined to the shaft 56, and thus when either of these clutches is shifted into engagement with an adjacent gear, for instance when the clutch 62 engages the gear 57, a direct drive exists between the driving shaft 51 and the driven shaft 61 thru the gears 54, 55, shaft 56, clutch 62, gear 57, gear 57a to the shaft 61. As in the form of the invention shown in Fig. 1, the load is carried and the motion is transmitted during the transition from one fixed ratio to the next by the gears 57 and 60, which thus become the supplemental gear sets.

Also carried concentric with the shaft 56 and actually thereon, in the form of the invention illustrated, are sprockets 64 and 65 and gears 66 and 67 which drive, respectively, sprockets 64a and 65a and gears 66a and 67a secured to a sleeve 68, which is concentric with the output shaft 52 of the variable speed unit. Between the sprockets 64 and 65 and connectible to either of them is a double face clutch 69 and between the gears 66 and 67 and connectible to either of them is a double face clutch 70. The clutches 69 and 70 are splined to the countershaft 56 and when one of them is shifted into engagement with an adjacent gear the drive from the driving shaft 51 is direct to the sleeve 68 through the gears 54 and 55, shaft 56, gears 67 and 67a, for instance, to the sleeve 68.

The transmission of power or motion from the variable speed unit shaft 52 and the fixed speed ratio sleeve 68 is through a differential mechanism 71 which, in the form shown, comprises a fork 72 secured to the driven shaft 61 and having idler gears 73. A bevel gear 74 on the variable speed shaft 52 meshes with the idler gears 73 on one side thereof while the bevel gear 75 on the fixed ratio sleeve 68 meshes with the idler gears 73 on the opposite side thereof. It will be understood by those skilled in the art that the rotation of the driven shaft 61 (the clutches 62 and 63 being disengaged) will be resultant of the speed and relative direction of rotation of the bevel gears 74 and 75. While the gears 66 and 66a directly engage and the gears 67 and 67a also directly engage, the sprockets 64 and 64a, and 65 and 65a are connected by sprocket chains 64b and 65b respectively. Thus, assuming that the shaft 56 turns clockwise, when the sprocket 64 is coupled to the shaft 56 it will likewise turn clockwise and the sprocket 64a driven by the chain 64b will also turn clockwise, while when the gear 66 is coupled with the shaft 56 it will turn clockwise but the gear 66a meshing with it will turn counterclockwise. Thus, under some conditions the sleeve 68 is rotated clockwise and under other conditions it is rotated counterclockwise.

As illustrated, the driving shaft 51, in the form of the invention shown in Fig. 2, is assumed to have a speed at the moment of 2000 R. P. M. The variable speed unit is assumed to have a variation in speed from 1500 R. P. M. to 2500 R. P. M. on the output shaft 52. The gears 54 and 55 having a ratio of 3:4 will cause the shaft 56 to rotate clockwise at 1500 R. P. M. With the control lever 53 of the variable speed unit set for minimum speed, i. e. 1500 R. P. M., the output shaft 52 will rotate counterclockwise and thus the bevel gear 74 on the shaft 52 will rotate counterclockwise while the bevel gear 75 rotates clockwise, resulting in a no speed condition of the driven shaft 61. As the lever 53 on the variable speed unit is advanced, the speed of the gear 74 increases with the result that the fork 72 of the differential mechanism 71 is rotated counterclockwise at half the speed of the bevel gear 74 and will reach a speed of 500 R. P. M. when the variable speed unit reaches 2500 R. P. M. The fork 72, being secured to the driven shaft 61, will turn the latter at 500 R. P. M. While this is occurring, the gear 57a is driving the gear 57 and due to the difference in diameter between the two gears (a ratio of 3:1) the gear 57 is rotating at the rate of 1500 R. P. M., which is the same speed as the countershaft 56. If the speed of the driven shaft 61 is to be increased beyond 500 R. P. M., the clutch 62 is moved to engage the gear 57 so that a fixed ratio drive is established from the constantly rotating countershaft 56 to the driven shaft 61. Then the clutch 69 is disengaged from the sprocket 64 which releases the bevel gear 75, sleeve 68 and gears thereon from the influence of the countershaft and permits them to rotate freely. The variable speed unit is then adjusted to the lower limit, i. e. to an output speed of 1500 R. P. M. With the bevel gear 74 rotating at 1500 R. P. M. in a clockwise direction and the fork 72 and idler gears 73 thereon rotating at 500 R. P. M., the bevel gear 75 rotates clockwise at 500 R. P. M. Since the sprocket 65a is secured to the bevel gear 75 through the sleeve 68, it too is rotating at 500 R. P. M. in a clockwise direction and this, through the sprocket chain 65b, causes the sprocket 65 to rotate clockwise at 1500 R. P. M. (the ratio being 3:1) which is the speed and direction of the countershaft 56. The clutch 69 is then caused to engage the sprocket 65 which is turning in synchronism with it so that the load is now taken by the main gearing 65, 65a and the variable speed unit. Then the clutch 62 is disengaged from the gear 57, the shaft 61 continuing to rotate at 500 R. P. M. To increase the speed of the driven shaft 61, the variable speed unit is again advanced with the result that greater travel is imparted to the idler gears 73 of the differential and the speed of rotation of the fork carrying them is increased. This continues until the speed of the bevel gear 74 is increased to 2500 R. P. M., at which time the resultant of the rotation of the bevel gears 74 and 75 produced a speed of 1000 R. P. M. on the driven shaft 61. The shaft 61 and the gears thereon rotating at 1000 R. P. M., the sprocket 65, which has a ratio of 3:1 with the sprocket 65a, rotates at 500 R. P. M. in synchronism with the countershaft 56. If the speed of the driven shaft is to be increased beyond 1000 R. P. M., the clutch 62 is shifted into engagement with the gear 58 so that the drive is again direct from the drive shaft 51 through the counter shaft 56 to the driven shaft 61. The ratio of the gear 58a to the gear 58 being 1½:1. When this has happened the clutch 69 is disengaged from the sprocket 65 with the result that the bevel gear 75, sleeve 68 and gears thereon are free to turn without performing work. The variable speed unit is adjusted to reduce the output speed to 1500 R. P. M. As a result, the bevel gear 75 is caused to rotate counterclockwise and the gear 66a is thereby caused to rotate counterclockwise at 500 R. P. M. causing the gear 66 to rotate clockwise at 1500 R. P. M., the ratio of the gears 66 and 66a being 3:1. Then the clutch 70 is shifted to engage the gear 66 with which it is turning in synchronism. Since the load is then carried jointly by the variable speed unit turning at 1500 R. P. M. and the gear 66a turning at 500 R. P. M., the clutch 62 can be disengaged from the gear 58 and acceleration of the variable speed unit from 1500 R. P. M. to 2500

R. P. M. will increase the speed of rotation of the driven shaft 61 from 1000 R. P. M. to 1500 R. P. M.

To further increase the speed of the driven shaft 61, the clutch 63 is caused to engage the gear 59, the clutch 70 to disengage the gear 66, the variable speed unit is decelerated to 1500 R. P. M., the clutch 70 is caused to engage the gear 67, and the clutch 63 is disengaged from the gear 59. The range of variation is then from 1500 R. P. M. to 2000 R. P. M. for the driven shaft 61.

The variable speed unit may be again advanced to 2500 R. P. M. which will increase the speed of the driven shaft to 2000 R. P. M. If it is desired to maintain a speed of 2000 R. P. M. on the driven shaft 61 by direct drive, the last step in the above-described operation may be that of clutching the gear 60 (which has a ratio of 3:4 with the gear 60a) to the countershaft 56 and optionally unclutching the gear 67.

It should be understood that any selected speed may be maintained by holding the variable speed unit control 53 in an adjusted position and that if a direct drive between the driving shaft 51 and the driven shaft 61 is desired the operations may be interrupted with one of the fixed ratio standby gears 57 to 60 operating.

To increase the ratio between the driving shaft 51 and driven shaft 61, that is to say, reduce the speed of the driven shaft, the reverse operations are carried out. For instance, assuming a speed of 2000 R. P. M. on the driven shaft with the clutch 70 engaged with the gear 67 and the clutch 63 disengaged from the gear 60, the variable speed unit is decelerated to 1500 R. P. M., then the clutch 63 is engaged with the gear 59 and the clutch 70 disengaged from the gear 67. Then the variable speed unit is accelerated to 2500 R. P. M., the clutch 70 caused to engage the gear 66 and the clutch 63 disengaged from the gear 59. The operation may be continued in this order until the driven shaft 61 is held at no speed.

These operations may be performed by hand or automatically in predetermined sequence. For instance, as shown the variable speed unit control lever 53 may be operated by a link 80 engaging a cam 81 driven by a worm gear 82 and worm 83 on a shaft 84 driven by a crank 85 or otherwise.

The cam 81 is shaped to cause the lever 53 to advance and return as the shaft 84 is rotated and in timed relation thereto. The shaft 84 also has a screw thread 86 and a nut 87 which travels along the shaft as the latter is rotated. Operated by the nut 87 is a clutch control bar 88 carrying a plurality of cam fingers 89, one for each of the clutches 63, 62, 69 and 70. These fingers have cam surfaces 90 which engage followers 91 carried by clutch shifters 92, and are so positioned that as the clutch control bar advances or recedes as a result of the operation of the shaft 84, the clutches are operated in the sequence above set forth. The cam surfaces are so organized and arranged that the cams are operated while the followers 93 of the variable speed control link 80 are on dwells 94 on the cam 81.

Fig. 3, a universally variable transmission of the kind shown in Figs. 1 and 2 but arranged so as to avoid the necessity of employing a differential mechanism is shown.

In this form of the invention, there is a driving shaft 100 on the input side of a variable speed unit 101 having on the output side a shaft 102. A driven shaft 103 carries for free rotation thereon gears 104, 105, 106, 107 and 108 meshing respectively with gears 104a, 106a and 108a fixed to the shaft 102 and 105a and 107a fixed to the shaft 100.

Clutches or couplings 109, 110 and 111 driven by the shaft 103 may be operated to selectively connect the gears 104 to 108 to the driven shaft 103.

The variable speed unit has a control lever 112 movable from a zero speed position shown in full lines in Fig. 3 progressively to the dotted line position to progressively increase the speed of the output shaft from a ratio of infinity to say 1:1 in relation to the input shaft. Thus, if, as in the above examples, the speed of the drive shaft is 2000 R. P. M., the output shaft may be driven at from no speed to 2000 R. P. M.

Assuming these speeds for purposes of explanation, the operation of the form of the invention shown in Fig. 3 is as follows:

With the control lever 112 at zero speed position and clutch 109 coupling the gear 104 to the shaft 103, advancement of the lever caused the ouput shaft 102 to operate and through the gears 104 and 104a, the ratio of which is 4:1, will cause the shaft 103 to rotate at one quarter the speed of the output shaft, that is to say, at 500 R. P. M. when the output shaft turns at its maximum—2000 R. P. M.

At this movement all the gears 104a to 108a are turning at 2000 R. P. M. To increase the speed of the driven shaft 103 beyond 500 R. P. M., the clutch 110 is caused to engage the gear 105 which at that time is turning synchronously with the shaft 103 and clutch 110, because the ratio between the gear 105 and the gear 105a on the shaft 100 is 4:1. Since the drive is now direct between the driving shaft 100 and the driven shaft 103, the clutch 109 may be disengaged from the gear 104, uncoupling the driven shaft from the variable speed output shaft 102. The control lever 112 of the variable speed unit may then be returned to establish a determinate intermediate speed. In the example given, the control lever is moved to a position shown in dot and dash lines establishing an output shaft speed of 1000 R. P. M. When this has been done, the clutch 109 can be caused to couple the gear 106 to the driven shaft 103 because the gear 106 has a ratio of 2:1 with relation to the gear 106a, and thus the gear 106 is turning in synchronism with the clutch 109. When this is done, the clutch 110 may be disengaged from the gear 105 and the control handle 112 may be advanced to increase the speed of the driven shaft 103, the driving occurring through the variable speed output shaft 102, gear 106a, gear 106, and clutch 109.

When the control lever 112 is further advanced to produce an output shaft speed of 2000 R. P. M., producing a driven shaft speed of 1000 R. P. M., and it is desired to increase the speed of the driven shaft beyond that point, the clutch 110 is caused to engage the gear 107, which has a 2:1 ratio with the gear 107a rotating at 2000 R. P. M. Thus the gear 107 and the clutch 110 are rotating in synchronism and may be coupled without clashing. Then the clutch 109 is disengaged from the gear 106, thus freeing the output shaft 102 from the variable speed drive. The variable speed control lever 112 is again returned to the 1000 R. P. M. position, and when this has been done the clutch 111 may be caused to engage the gear 108. Since the ratio of the gear 108 and the gear 108a is 1:1, the gear 108 and the clutch 111 are turning in synchronism, and therefore may engage without clashing. After this, the clutch 110 is disengaged from the gear 107 and the drive from the driving shaft 100 to the driven shaft 103 is through the variable speed output shaft 102, gear 108a, gear 108, and clutch 111, and may be increased by the advancement of the controller 112 to a speed of 2000 R. P. M.

At this point, if desired, a clutch 113 on the driven shaft 103 may be engaged with a gear 114 on the shaft meshing with a gear 115 on the drive shaft 100. The gears 114 and 115 have a 1:1 ratio and thus maintain a direct drive between the drive shaft 100 and the driven shaft 103, both turning at 2000 R. P. M. The clutch 111 may then be disengaged from the gear 108, thereby relieving the variable speed unit 101 of all the load.

In decelerating the speed of the driven shaft 103 through the fixed ratios, the reverse operations are performed. For instance, assuming that the clutch 111 engages the gear 108 and the control lever 112 produces an output shaft speed of 2000 R. P. M., deceleration of the variable speed unit will reduce the speed of the driven shaft 103 to 1000 R. P. M., at which time the clutch 110 is caused to engage the gear 107, the clutch 111 to disengage the gear 108, the control lever 112 advanced to the 2000 R. P. M. position, and the clutch 109 to engage the gear 106, following which the clutch 110 is disengaged from the gear 107. Deceleration of the output shaft 102 by the movement to 1000 R. P. M. position will reduce the speed of the driven shaft to 500 R. P. M., at which time the clutch 110 is caused to engage the gear 105, the clutch 109 caused to disengage the gear 106, the control lever 112 to be advanced to the 2000 R. P. M. position, the clutch 109 caused to engage the gear 104, and the clutch 110 to disengage the gear 105. Subsequent deceleration of the output shaft from the 2000 R. P. M. position may be continued through the 1000 R. P. M. position to the zero position.

While it should be understood that any suitable variable speed unit may be employed in combination with the fixed ratio gears and their controlling means, there is illustrated herein in Fig. 4 a hydraulic type variable speed unit which is well known and available on the market. This unit comprises a shaft 116 which for present purposes will be identified as the input shaft, and a shaft 117 which will be designated as the output shaft. These shafts are mounted in a suitable casing 118 through which extends a control shaft 119 which adjusts a tilting box 120 pivoted on a pin 121. The tilting box contains a socket ring 122 containing the ball-shaped ends of connecting rods 123 operating pistons 124 with longer or shorter strokes depending upon the degree to which the box 120 is tilted. The pistons 124 operate in cylinders 125 and pump oil from the cylinders 125 into cylinders 126. In the cylinders 126 are pistons 127 having connecting rods 128, the ball-shaped ends of which are engaged in a socket ring 129 of an angle box 130 carried by the casing 118. The socket ring 129 is fulcrumed on a pin 131 carried by the output shaft 117 so that the thrust of the pistons 127 transmitted to the socket ring 129 bearing on the angle box causes the rotation of the shaft 117 at a predetermined ratio with respect to the shaft 116 depending upon the setting of the tilting box 120. When the tilting box is perpendicular to the axis of the input shaft 116, there is no reciprocating motion transmitted to the pistons 124, but as the tilting box is adjusted out of right angle relation to the input shaft 116, the strokes of the pistons 124 are increased until, as shown in Fig. 4, the augularity of the tilting box equals that of the angle box when the ratio is 1:1.

Variations and modifications may be made within the scope of the claims and portions of the improvements may be used without others.

I claim:

1. The method of transmitting motion from a driving member to a driven member at variable speed ratios which comprises driving a variable speed unit by the driving member in increments from nil to a determinate speed; driving the driven member by the variable speed unit and thereby increasing or decreasing the speed thereof between upper and lower determinate limits of output speed of the variable speed unit; at said one of said determinate limits, connecting the driven member, to the driving member through a fixed ratio drive and a coupling means isochronal with the driven member to drive the former by the latter; uncoupling the variable speed unit from the driven member; changing the output speed of the variable speed unit to its other limit of output speed; connecting the variable speed unit to the driven member through a coupling means isochronal with the driven member at said output speed of the variable speed unit; disconnecting the fixed ratio drive between the driving member and the driven member; and driving the driven member through the variable speed unit and the isochronal coupling means.

2. The method of transmitting motion from a driving member to a driven member at variable speed ratios which comprises driving a variable speed unit by the driving member in increments from nil to a determinate speed; driving the driven member by the variable speed unit and thereby increasing or decreasing the speed thereof between upper and lower determinate limits of output speed of the variable speed unit; at said one of said determinate limits, connecting the driven member to the driving member through a fixed ratio drive and a coupling means isochronal with the driven member to drive the former by the latter; uncoupling the variable speed unit from the driven member; changing the output speed of the variable speed unit to its other limit of output speed; connecting the variable speed unit to the driven member through a coupling means isochronal with the driven member at said output speed of the variable speed unit; disconnecting the fixed ratio drive between the driving member and the driven member; and driving the driven member through the variable speed unit and the isochronal coupling means; changing the output speed of the variable speed unit to that of the other limit thereof; again connecting the driven member to the driving member through a fixed ratio drive and a coupling means isochronal with the driven member; uncoupling the variable speed unit from the driven member; changing the output speed of the variable speed unit to an opposite limit of speed output; connecting the variable speed unit to the driven member through a coupling means isochronal with the driven member at said opposite limit of speed output; uncoupling the fixed ratio drive between the driving member and the driven member; and driving the driven member through said variable speed unit and isochronal coupling means to change the speed of the driven member.

3. The method of transmitting motion from a driving member to a driven member at variable speed ratios which comprises driving a variable speed unit by the driving member in increments from nil to a determinate speed; driving the driven member by the variable speed unit and increasing the speed thereof to a first determinate value controlled by the variable speed unit; at said first determinate speed connecting the driven member to the driving member through a fixed ratio drive and a coupling means isochronal with the driven member to drive the former by the latter; uncoupling the variable speed unit from the driven member; reducing the output speed of the variable speed unit to a determinate value; connecting the variable speed unit to the driven member through a coupling means isochronal with the driven member at the reduced output speed of the variable speed unit; uncoupling the fixed ratio drive between the driving member and the driven member; and driving the driven member through the variable speed unit and the isochronal coupling means to increase the speed of the driven member beyond said first determinate value.

4. The method of transmitting motion from a driving member to a driven member at variable speed ratios which comprises driving a variable speed unit by the driving member in increments from nil to a determinate speed; driving the driven member by the variable speed unit and increasing the speed thereof to a first determinate value controlled by the variable speed unit; at said first determinate speed connecting the driven member to the driving member through a fixed ratio drive and a coupling means isochronal with the driven member to drive the former by the latter; uncoupling the variable speed unit from the driven member; reducing the output speed of the variable speed unit to a determinate value; connecting the variable speed unit to the driven member through a coupling means isochronal with the driven member at the reduced output speed of the variable speed unit; uncoupling the fixed ratio drive between the driving member and the driven member; and driving the driven member through the variable speed unit and the isochronal coupling means to increase the speed of the driven member beyond said first determinate value to a second determinate value; again coupling the driven member to the driving member through a fixed ratio drive and a coupling means isochronal with the driven member; uncoupling the variable speed unit from the driven member; reducing the output speed of the variable speed unit to a determinate value; connecting the variable speed unit to the driven member through a coupling means isochronal with the driven member at said second determinate speed; uncoupling the fixed ratio drive between the driving member and the driven member; and driving the driven member through said variable speed unit and isochronal coupling means to increase the speed of the driven member beyond said second determinate value.

5. The apparatus for transmitting motion, comprising a driving member, a driven member, a variable speed unit, means for driving the variable speed unit by the driving member; means including a differential for driving the driven member by the variable speed unit and increasing the speed of the driven member from nil to a first determinate value controlled by the variable speed unit; means for connecting the driven member to the driving member, said means including a fixed ratio drive and a coupling means isochronal with the driven member at said first determinate speed to drive the former by the latter; means to disconnect the variable speed unit from the driven member; means for reducing the output speed of the variable speed unit to a determinate value; means connecting the variable speed unit to the driven member through a fixed ratio drive including a coupling means isochronal with the driven member at the reduced output speed of the variable speed unit; means disconnecting the fixed ratio drive between the driving member and the driven member whereby the driven member is driven through the variable speed unit and the isochronal coupling means to increase the speed of the driven member beyond said first determinate value.

6. The apparatus for transmitting motion, comprising a driving member, a driven member, a variable speed unit, means for driving the variable speed unit by the driving member; means including a differential for driving the driven member by the variable speed unit and increasing the speed of the driven member from nil to a first determinate value controlled by the variable speed unit; means for connecting the driven member to the driving member, said means including a fixed ratio drive and a coupling means isochronal with the driven member at said first determinate speed to drive the former by the latter; means to disconnect the variable speed unit from the driven member; means for reducing the output speed of the variable speed unit to a determinate value; means connecting the variable speed unit to the driven member through a fixed ratio drive including a coupling means isochronal with the driven member at the reduced output speed of the variable speed unit; means disconnecting the fixed ratio driving means between the driving member and the driven member whereby the driven member is driven through the variable speed unit and the isochronal coupling means to increase the speed of the driven member beyond said first determinate value to a second determinate value; means for connecting the driven member directly to the driving member, said means including a fixed ratio drive and a coupling means isochronal with the driven member; means for disconnecting the variable speed unit from the driven member at said second determinate speed whereby the output speed of the variable speed unit may be reduced to a determinate value; means connecting the variable speed unit to the driven member through a coupling means isochronal with the driven member at said second determinate speed; means disconnecting the fixed ratio drive between the driving member and the driven member whereby the driven member is driven through said variable speed units and said last named coupling means to increase the speed of the driven member beyond said second determinate value.

7. The method of transmitting motion from a driving member to a driven member at variable speed ratios which comprises driving a variable speed unit by the driving member in increments from nil to a determinate speed; driving the driven member through said variable speed unit and a selected one of a plurality of fixed ratio gear sets; controlling the variable speed unit to bring the driven member to a determinate speed equal to that of the gear set to be selected; connecting the driving member and the driven member to maintain said determinate speed of the latter independently of said variable speed unit; disconnecting the variable speed unit and the gear sets from said driven member; controlling the variable speed unit to bring the next gear set to be selected to the speed of the driven member; connecting the said next gear set to the driven member; disconnecting the drive of the driving member from the driven member; and controlling the variable speed unit to drive the driven member at the desired speed.

8. The apparatus for transmitting motion comprising a driving member, a driven member; a variable speed unit connected to the driving member; means for driving the driven member through said variable speed unit including a plurality of selectable fixed ratio gear sets and a differential; means controlling the variable speed unit to bring the driven member to a determinate speed equal to that of a gear set to be selected; means connecting the driving member and the driven member to maintain said determinate speed of the latter independently of said variable speed unit; means disconnecting the variable speed unit and the gear sets from said driven member; means controlling the variable speed unit to bring the next gear set to be selected to the speed of the driven member; means connecting the said next gear set to the driven member; means disconnecting the driving member from the driven member; and means controlling the variable speed unit to drive the driven member at the desired speed.

9. The method of transmitting motion from a driving member to a driven member through a variable speed unit operating between nil and determinate ratio limits which comprises driving a variable speed unit by the driving member; driving the driven member through said variable speed unit and a selected one of a plurality of fixed ratio gear sets; adjusting the variable speed unit to one determine limit to bring the driven member to a determinate speed equal to that of the gear set to be selected; connecting the driving member and the driven member to maintain said determinate speed of the latter independently of said variable speed unit; disconnecting the variable speed unit and the gear sets from said driven member; adjusting the variable speed unit to the other determinate limit to bring the next gear set to be selected to the speed of the driven member; connecting the said next gear set to the driven member; disconnecting the driving member from the driven member; and adjusting the variable speed unit to drive the driven member at the desired speed.

10. The method of transmitting motion from a driving member to a driven member at variable speed ratios through a variable speed unit of limited range of speed change from nil to determinate value and fixed ratio gear sets, which is characterized by the step of driving the driven member directly by one of a group of standby fixed ratio gear sets while the variable speed unit is being adjusted, while idling, between nil and said determinate value in preparation for the selection of a related one of a group of main drive fixed ratio gear sets.

11. The method of transmitting motion from a driving member to a driven member at variable speed ratios through a variable speed unit operating between nil and determinate ratio limits and fixed ratio gear sets, which is characterized by the step of driving the driven member directly by one of a group of standby fixed ratio gear sets while the variable speed unit is being adjusted, while idling to change its ratio from high to low or low to high ratio limit depending on whether the ratio between the driving member and the driven member is to be increased or decreased in preparation for the selection of a related one of a group of main-drive fixed ratio gear sets.

12. The apparatus for transmitting motion from a driving member to a driven member at variable speed ratios including a variable speed unit of limited range of speed change from nil to determinate value and fixed ratio gear sets connected to the driving member, said gear sets comprising main drive fixed ratio gear sets and standby fixed ratio gear sets, which is characterized by means for driving the driven member directly by one of a group of standby fixed ratio gear sets while the variable speed unit is being adjusted, while idling, between nil and said determinate value in preparation for the selection of a related one of a group of main drive fixed ratio gear sets.

13. Apparatus for transmitting motion comprising a driving member; a driven member; a variable speed unit connected to the driving member; means for driving the driven member through said variable speed unit and a selected one of a plurality of fixed ratio gear sets and a differential; means controlling the variable speed unit to bring the driven member to a determinate speed equal to that of a gear set to be selected; means connecting the driving member and the driven member to maintain said determinate speed of the latter independently of said variable speed unit; means disconnecting the variable speed unit and the gear sets from said driven member whereby the variable speed may be adjusted to bring the next gear set to be selected to the speed of the driven member; and means connecting the said next gear set to the driven member whereby, upon disconnecting the driving member from the driven member and controlling the variable speed unit, the desired speed of the driven shaft in the ratio range selected may be obtained.

14. The invention as defined in claim 13, in which the means connecting the driving member to the driven member includes a plurality of supplemental fixed ratio gear sets.

15. The invention as defined in claim 13, in which there is a differential mechanism between the variable speed unit and the said fixed ratio gear sets and connected to said driven member.

16. The invention as defined in claim 13, in which there is a differential mechanism having a driving gear connected to the variable speed unit, another driving gear connected to the fixed ratio gear sets, idler gears, and a spider gear connected to the driven member.

17. The invention as defined in claim 13, in which there is automatic means, including an operating member, for controlling the variable speed unit, and the means for connecting and disconnecting the fixed ratio gear sets and connecting and disconnecting the driving and driven members sequentially according to a predetermined plan whereby the ratio between said driving member and said driven member may be gradually varied over the entire range of ratios for which the transmission is constructed.

18. A transmission including a driving member; a driven member; a variable speed unit of limited range of speed change from nil to determinate value; a plurality of selectable main drive fixed ratio gear sets; means connecting said driving member to said driven member in tandem through said variable speed unit and main drive fixed ratio gear sets to variably drive the driven member and including means for rendering said drive inoperative so as to cause said variable speed drive and fixed ratio gear sets to become idle; and means including a plurality of standby fixed ratio gear sets for driving the driven member from the driving member while the variable speed unit is being adjusted, while idling, between nil and said determinate value in preparation for the selection of a related one of said main drive fixed ratio gear sets.

19. A gear transmission having a plurality of selectable change speed gear sets producing different fixed speed ratios between a drive shaft and a driven shaft, and a progressively variable speed unit variable from nil to determinate speed connected to said drive and driven shafts in parallel with said fixed ratio gear sets to drive the driven shaft at variable speeds, said variable speed unit having an operating ratio range at least equal to the difference between each fixed ratio and the next for progressively changing the ratio between said shafts through said fixed ratios.

20. The combination with a drive shaft and a driven shaft of a variable speed transmission unit variable from nil to determinate speed to increase and decrease the speed of the driven shaft between no speed and maximum speed, a selective step gear transmission unit; means connecting said units to a common driving source of power; means connecting both said units to a common driven power outlet; means to vary the speed ratio of the variable speed transmission unit; means to shift gears in the selective step gear transmission unit; and means to bring said gears into synchronism for shifting by varying the ratio of the variable speed transmission unit.

21. The combination of a variable speed transmission unit variable from nil to determinate speed, a selective multiple step gear transmission unit having dual sets of gears; means connecting said units to a common driving source of power; means connecting both said units to a common driven power outlet; means to vary the speed ratio of the variable speed transmission unit between nil and determinate speeds; and means to alternately control the variable speed unit and each of the dual sets of gears to progressively vary the speed ratio between the common driving source of power and the common driven power outlet.

22. The method of transmitting power from a rotating driving member to an initially stationary driven member through a variable speed unit whose output is variable from nil to determinate speed and dual selective multiple step gear sets which includes the steps of first gradually adjusting the variable speed unit from nil output to said determinate speed to transmit power to the driven member at a predetermined speed ratio between the driving and driven members, at the same time bringing one of a pair of gears of one set of said multiple step gear sets into synchronism, then connecting said pair of synchronized gears to the driven member and disconnecting the variable speed unit therefrom, then readjusting the variable speed unit to another predetermined speed ratio and at the same time bringing one pair of gears of the other set of said multiple step gear sets into synchronism, connecting the last-named set of gears to the driven member, and disconnecting the variable speed unit from the driven member.

References Cited in the file of this patent

UNITED STATES PATENTS

| 2,255,963 | Benedek | Sept. 16, 1941 |
| 2,308,090 | McFarren | Jan. 12, 1943 |
| 2,618,988 | Woydt | Nov. 25, 1952 |
| 2,621,545 | Karig | Dec. 16, 1952 |

FOREIGN PATENTS

| 144,349 | Great Britain | 1920 |
| 555,298 | Germany | Feb. 27, 1927 |